US005648695A

United States Patent [19]

Yamaguchi et al.

[11] Patent Number: 5,648,695

[45] Date of Patent: Jul. 15, 1997

[54] BRUSH APPARATUS FOR ELECTRIC ROTATING MACHINE

[75] Inventors: Mineo Yamaguchi; Keiji Hashimoto, both of Kosai, Japan

[73] Assignee: Asmo Co., Ltd., Kosai, Japan

[21] Appl. No.: 445,522

[22] Filed: May 22, 1995

[30] Foreign Application Priority Data

Sep. 30, 1994 [JP] Japan .................................... 6-237399

[51] Int. Cl.$^{6}$ .......................... H02K 13/00; H01R 39/38

[52] U.S. Cl. .......................... 310/242; 310/239; 310/245; 310/247

[58] Field of Search .................................... 310/239, 242, 310/245, 247

[56] References Cited

U.S. PATENT DOCUMENTS

| | | | |
|---|---|---|---|
| 3,710,160 | 1/1973 | Voglesonger | 310/247 |
| 3,716,735 | 2/1973 | Dippold | 310/240 |
| 3,784,856 | 1/1974 | Preston | 310/239 |
| 3,792,298 | 2/1974 | Hamman | 310/242 |
| 4,420,705 | 12/1983 | Kimberlin | 310/242 |
| 4,553,057 | 11/1985 | Saeed | 310/242 |
| 4,593,220 | 6/1986 | Cousins et al. | 310/239 |
| 5,159,222 | 10/1992 | Southall | 310/239 |
| 5,184,041 | 2/1993 | Baer et al. | 310/239 |
| 5,397,952 | 3/1995 | Decker et al. | 310/242 |

FOREIGN PATENT DOCUMENTS

| | | |
|---|---|---|
| 3726-894-A | 12/1987 | Germany . |
| 63-56149A | 10/1988 | Japan . |
| 63-271875 | 11/1988 | Japan . |
| 2-94466 | 7/1990 | Japan . |
| 5-60154 | 8/1993 | Japan . |
| 8-3177 | 1/1996 | Japan . |

*Primary Examiner*—Steven L. Stephan
*Assistant Examiner*—Elvin G. Enad
*Attorney, Agent, or Firm*—Burns, Doane, Swecker & Mathis, LLP

[57] ABSTRACT

A brush apparatus for a rotary electric machine has a brush with a pigtail, a brush holder and a spring. The brush holder is formed with a slit and a stopper piece. The pigtail is passed through the slit when the brush is inserted into the brush holder, and thereafter the stopper piece is bent to close an opening the slit. Thus, the brush apparatus simplifies an inserting operation of the brush to the brush holder and prevents the brush and the spring from coming off due to wear of the brush.

1 Claim, 13 Drawing Sheets

BRUSH APPARATUS FOR ELECTRIC ROTATING MACHINE

CROSS REFERENCE TO RELATED APPLICATION

This application is based on and claims priority of Japanese Patent Application No. 6-237399 filed Sep. 30, 1994, the content of which is incorporated herein by reference.

BACKGROUND OF THE INVENTION

1. Field of the Invention

The present invention relates generally to an improvement of a brush apparatus of a rotary electric machine such as motors and, more particularly, to an improvement in preventing a brush from coming off from a brush holder by wearing.

2. Related Art

The prior art brush apparatus is proposed in Japanese Utility Model Laid-open No. 5-60154. In the prior art, a pigtail (feeder) is assembled integrally beforehand to a side surface of a brush in a compressing direction thereof. A slit, is formed at the side surface in the compressing direction of a brush holder holding the brush. A front end portion in the compressing direction of the slit is shaped to open outward. Near the opening end portion of the slit, a stopper piece is formed integrally with a fixed clearance relative to the side surface of the brush holder. When the brush is held in the brush holder, by using a slack or a loose portion of the pigtail, the brush is inserted into the brush holder with the pigtail passing through the slit by avoiding the stopper piece.

The longer an operation period of the rotary electric machine becomes, the more the brush is worn away. Therefore, the brush and the pigtail are compressed by a spring and gradually move toward the opening end portion of the slit. After the pigtail moves near the opening end portion of the slit, the pigtail contacts the stopper piece so that the brush and the spring are prevented from coming off.

However, in the prior art apparatus mentioned above, when the brush is held in the brush holder, the brush is assembled by using the slack of the pigtail while avoiding the stopper piece. Thus, when the rotary electric machine works, loosening is produced in the pigtail and the brush cannot be prevented from coming off, reducing the reliability.

In order to reduce the slack of the pigtail, when the brush is inserted into the brush holder, avoiding the stopper piece may become difficult and productivity in brush insert work is decreased.

SUMMARY OF THE INVENTION

It is an object of the present invention to provide an improved brush apparatus which is effective to simplify a brush insert work and to prevent assuredly coming off of a brush and a spring.

According to a first aspect of the invention, a brush apparatus comprises a brush, a pigtail fixed to the brush, a brush holder having an opening portion at a front end portion and a spring held in the brush holder to press the brush toward an outside of the front end portion of the brush holder. A slit opening at the front end portion is formed to extend in parallel to a pressing direction of the brush. Also on the brush holder, a stopper piece is formed integrally near an entrance opening portion of the slit. The stopper piece is bent and closes the entrance opening portion of the slit after the pigtail passes through the slit and the brush is inserted into the brush holder.

Since the stopper piece does not interrupt anything at brush insert assembly, productivity of brush apparatus assembly work is improved and manufacturing cost can be reduced. Since the stopper piece is bent after the brush insertion and the entrance open portion of the slit is closed thereby, a clearance between the stopper piece and the brush is set to a small value regardless of sensitivity of brush insert assembly so that the pigtail certainly engages the stopper piece. Therefore, when the brush is worn and moves to a side of the front end portion of the brush holder by the spring, the pigtail engages the stopper piece so that the brush and the spring can be certainly prevented from coming off.

According to a second aspect of the invention, a slit opening at the front end portion is formed to extend in parallel to a pressing direction of the brush. A stopper piece is arranged on a substrate near an entrance opening portion of the slit. The stopper piece is fixed at the substrate so as to close the entrance opening portion of the slit after the pigtail passes through the slit and the brush is inserted into the brush holder.

Since the stopper piece is fixed to the substrate after the brush insertion work so as to close the entrance opening portion of the slit, a space between the stopper piece and the brush is set to a small value regardless of sensitivity of brush insert assembly so that the pigtail can engage the stopper piece. Therefore, when the brush is worn and moves to the front end portion of the brush holder by the spring, the pigtail engages the stopper piece so that the brush and the spring can be certainly prevented from coming off.

According to a third aspect of the invention, on a brush, a pigtail producing portion being narrower than a brush width is formed and the pigtail is taken out therefrom. On the brush holder, a stopper piece formed at a wall portion in a side of the front end portion is formed integrally. A first slit formed to extend in parallel to a pressing direction of the brush is installed at the brush holder. In the brush holder, a second slit opening at the front end portion is installed at a different surface from a surface forming the first slit. The first slit communicates with the second slit at a side of a more rear end portion of the brush holder than the stopper piece is. When the brush is inserted into the brush holder, the pigtail passes through the second slit. Therefore, the pigtail is inserted into the first slit so that the pigtail contacts the stopper piece. Since the pigtail is inserted into the first slit by avoiding a stopper piece from the second slit at a brush insertion, the stopper piece does not interrupt anything thereat.

Since a pigtail producing portion being narrower than a brush width is formed at the brush and the pigtail is taken out therefrom, a space between the stopper piece closing the entrance opening portion of the first slit and the brush is set to a small value regardless of sensitivity of brush insert assembly so that the pigtail can certainly engage the stopper piece. Therefore, when the brush is worn and moves to the front end portion of the brush holder by the spring, the pigtail engages the stopper piece so that the brush and the spring can be certainly prevented from coming off.

According to a fourth aspect of the invention, on a brush holder, a slit opening at the front end portion is formed to extend in parallel to a pressing direction of the brush. On the brush holder, a stopper piece having elasticity and tilting toward a side of the brush holder rear end portion is formed near an entrance opening portion of the slit. When the brush is inserted into the brush holder, the pigtail is inserted into the slit by elastically deforming the stopper piece more at the side of the rear end portion.

Since the stopper piece returns to the former tilt portion by its elasticity after a brush insertion work and closes the entrance opening portion of the slit, the space between the stopper piece and the brush is set to a small value regardless of sensitivity of brush insert assembly work so that the pigtail certainly engages the stopper piece. Thus, when the brush is worn and moves to the front end portion of the brush holder by the spring, the pigtail engages the stopper piece so that the brush and the spring can be certainly prevented from coming off.

DETAILED DESCRIPTION OF THE EMBODIMENTS

The present invention will be described in detail with reference to various embodiments illustrated in the accompanying drawings.

(First Embodiment)

Figure 1:
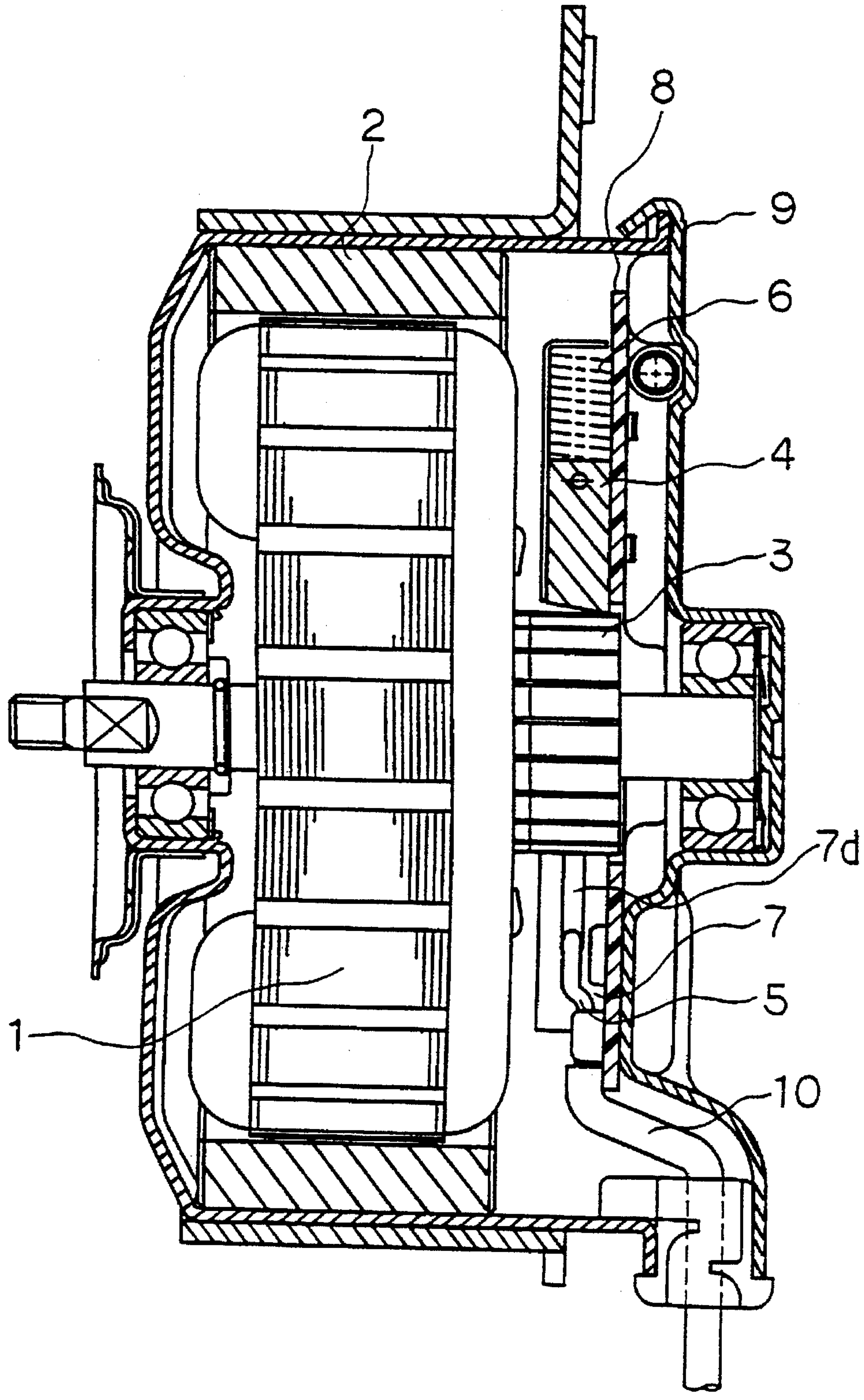
FIG. 1 is a longitudinal sectional view of a motor applied with a brush apparatus according to the present invention.
Figure 2:
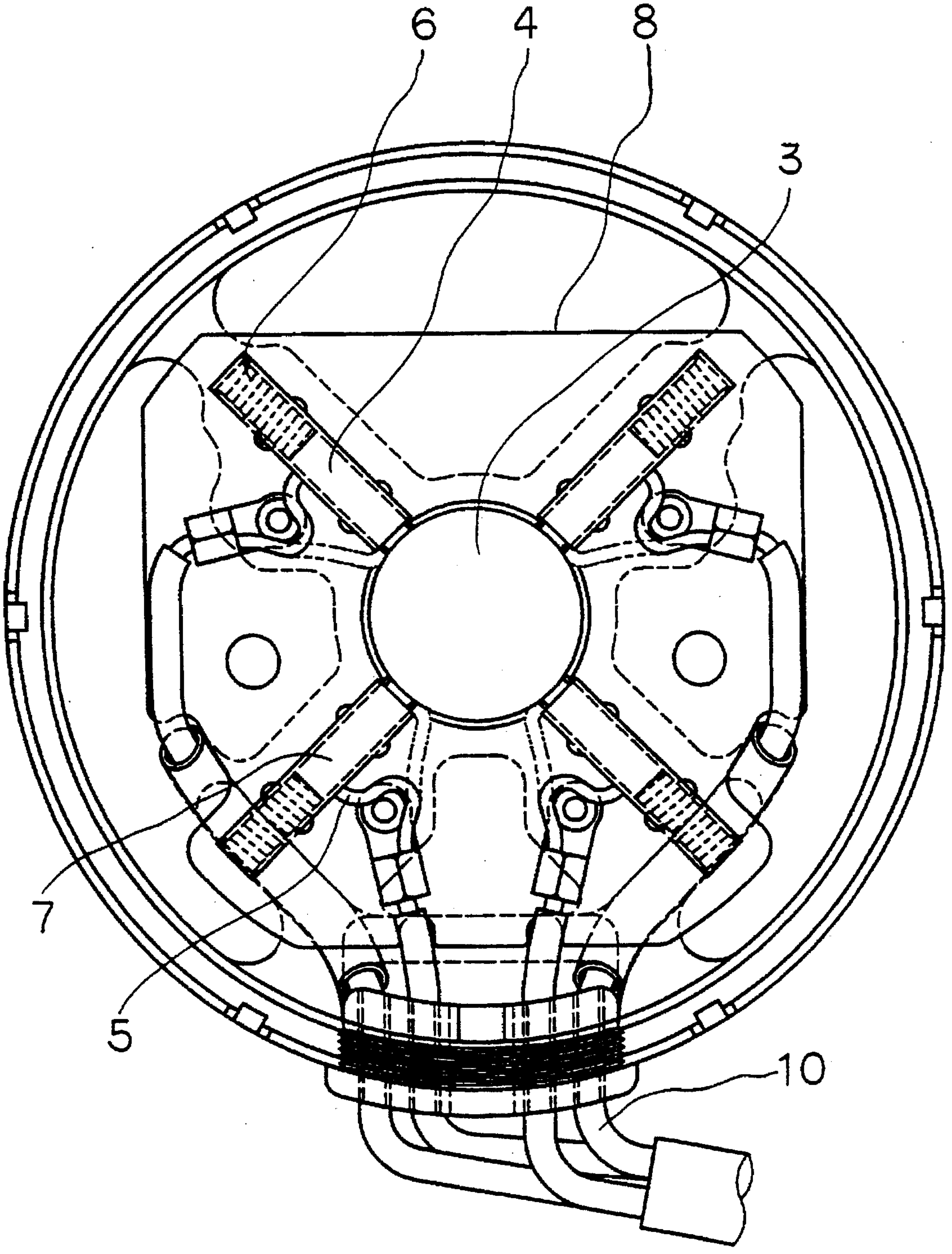
FIG. 2 is a side view illustrating a condition with an end plate of the motor in FIG. 1 being removed.

FIGS. 1 and 2 illustrate a whole construction of a radiator cooling fan motor (direct current motor) for vehicles to which a brush holder apparatus of the present invention is applied. The brush apparatus comprises an armature 1, a field magnet 2, a commutator 3 and a brush 4 made of a conductive material. As shown in FIG. 2, four brushes 4 are arranged equi-angularly on an outer circumference of the commutator 3 to contact the same. A pigtail 5 as an electric power feeder is assembled to the brush 4 by being formed integrally therewith when the brush 4 is formed. A coil spring 6 constitutes a spring means for pressing the brush 4 toward the commutator 3 and can be replaced with a torsion spring, a leaf spring, a glass-shaped spring or the like. A brush holder 7 holding the brush 4 and the spring 6 is made of a metallic material such as brass, stainless steel or the like which can be bent.

A substrate 8 is made of an electrically insulating material such as a phenol resin and the brush holder 7 is installed thereto by appropriate means. For example, an installation claw portion not shown in the figures is formed integrally at a base portion of the brush holder 7. The installation claw portion is inserted into an installation hole portion of the substrate 8 not shown in the figures. The tip portion of the installation claw portion is caulked with a rear surface portion of the substrate 8, whereby the brush holder 7 is fixed to the substrate 8. The substrate 8 is fixed to an end plate 9 of a motor housing. An electrical lead 10 is electrically connected to the pigtail 5 so that electricity flows through the brush 4 from an outer electric power source.

Figure 3A:
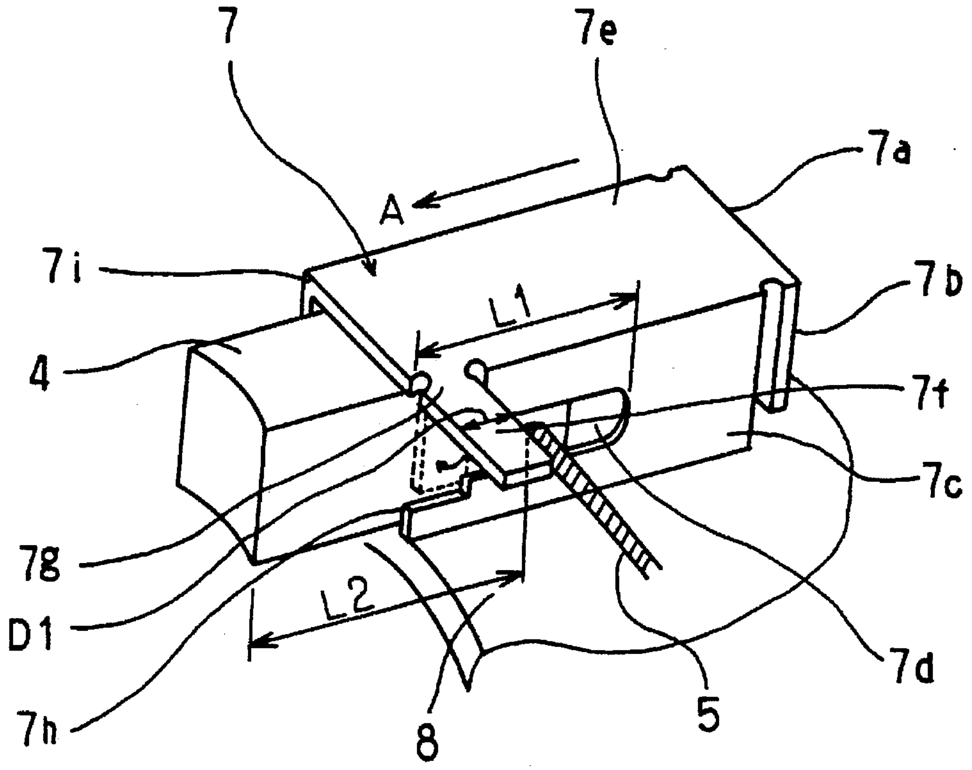
FIG. 3A is a perspective view illustrating the brush apparatus of the first embodiment according to the present invention.

The brush holder 7 is explained with reference to FIGS. 3A and 3B. The brush holder 7 is made by passing a plate made of the metallic material into a box-shape having an opening only in a bottom base portion. At a rear end of the brush holder 7, a holding surface **7*b* is formed integrally by bending to hold an end of the spring 6** which is opposite to the brush.

On a side surface **7*c* (a surface extending perpendicular to the substrate 8) of the brush holder 7, a slit 7*d* having a depth L1 extending in the same direction as a compressing direction (an arrow direction A of FIG. 3A) of the brush 4 is formed. A side of a tip end of the slit 7*d* (a side of a front end portion 7*i* of the brush holder 7) is open outward. In a side 7*e* differing from the side surface 7*c* forming the slit 7*d*, a stopper piece 7*f* having a width dimension D1 at a position next to an opening portion of the slit 7*d* is formed integrally. A necking portion 7*g* having the narrower width dimension D1 is formed at a base portion of the stopper piece 7*f* so that the stopper piece 7*f* can be easily bent. However, the necking portion 7*g* is not necessarily required and can be removed. The longitudinal depth L1 of the slit 7*d* is made longer by a predetermined dimension than a dimension (L2+D1) which is a sum of a distance L2 from the tip end portion of the brush 4** to a pigtail installation position and the width D1 of the stopper piece 7*f*. This is because a jig (not shown) for preventing deformation of the brush holder 7 can be inserted into an inside of the stopper piece 7*f* of the brush holder 7 at the time of bending the stopper piece 7*f*.

Assembly method of the brush 4 to the brush holder 7 is explained. Since the brush holder 7 has an opening portion at the front end portion 7*i*, the brush 4 having the pigtail 5 is inserted longitudinally in the brush holder 7. At that time, since the stopper piece 7*f* is located at a position B in FIG. 3B, the pigtail 5 can move freely in the slit 7*d* without being interrupted thereby. Therefore, insert assembly of the brush 4 can be carried out easily. When a bending process of the stopper piece 7*f* is carried out thereafter, since the strength of the brush holder 7 becomes weak where the stopper piece 7*f* is formed, the brush holder 7 is likely to be deformed. Provided that vertical and horizontal dimensional changes in a space inside of the brush holder 7 are produced, the brush 4 cannot slide smoothly inside the brush holder 7. Therefore, the dimensional changes should be prevented. A metallic jig (cored bar) having a cross-sectional shape with the same vertical and horizontal dimensions as the inside dimensions of the brush holder 7 is inserted into the brush holder 7 by pressing the brush 4 in the opposite direction to arrow A from the side of the front end portion 7*i*. Then, the stopper piece 7*f* is bent to take the position C indicated by a dotted line in FIG. 3B by an appropriate jig not shown in the figure. Therefore, the stopper piece 7*f* can be bent, while preventing vertical and horizontal dimensional changes the space inside the brush holder 7.

At the opening portion at the side of the front end portion 7*i* of the slit 7*d*, a step portion 7*h* whose width is narrowed toward a side of the substrate 8 is formed. The tip of the stopper piece 7*f* is bent so as to be opposed to the step portion 7*h* without contacting. Thus, the tip of the stopper piece 7*f* is positioned closer to the substrate 8 than the pigtail 5 is after the tip thereof is bent.

The spring 6 is inserted into the brush holder 7 from the side of a rear end portion 7*a* before bending the holding surface 7*b*, i.e., while the rear end portion 7*a* of the brush holder 7 is open. Then, the holding surface 7*b* is bent to a position shown in FIG. 3A to hold the spring 6 in the brush holder 7. There is no slit at the rear end portion 7*a* having the holding surface 7*b* and, hence, the brush holder 7 is not deformed when the holding surface 7*b* is bent.

As the rotary electric machine such as a motor assembled as above is operated, the brush 4 is worn gradually and moves by being pressed in the arrow direction A by the spring 6. Since the pigtail 5 certainly contacts the stopper piece 7*f*, not only the brush 4 but the spring 6 can be certainly prevented from coming off. A clearance G1 between the stopper piece 7*f* and the brush 4 after bending the stopper piece 7*f* can be determined in a range less than twice the thickness of the pigtail 5 (usually around 1 mm in diameter) regardless of brush insert assembly work so that the brush 4 can be prevented from coming off. That is, at a base portion of the pigtail 5 fixed to the brush 4, a minimum outer diameter of bending the pigtail 5 becomes more than twice the thickness of the pigtail 5 normally due to mechanical strength thereof. Therefore, by setting a value of the clearance G1 in a range less than twice the thickness of the pigtail 5, the base portion thereof can be prevented from being inserted into the clearance G1 in a bent form.

Figure 3B:
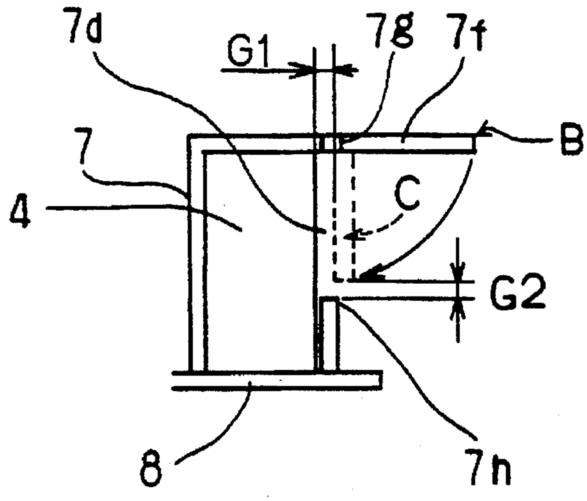
FIG. 3B is a side view illustrating the brush apparatus of the first embodiment according to the present invention.

When it is difficult to locate the tip end of the stopper piece 7*f* closer to the substrate 8 rather than the pigtail 5 is after a tip end of the stopper piece 7*f* is bent, a clearance G2 shown in FIG. 3B between the tip position after being bent and the slit 7*d* may be determined to a dimension less than the thickness of the pigtail 5. Thus, the pigtail 5 can be prevented from coming off from the clearance G2 and the brush 4 and the spring 6 can be prevented from coming off from the brush holder 7.

In the first embodiment mentioned above, the slit 7*d* is formed at the side surface 7*c* of the brush holder 7, i.e., at a surface extending perpendicular to the substrate 8. The stopper piece 7*f* is formed integrally with the different surface 7*e*, i.e., with a surface extending parallel to the substrate 8 from the side surface 7*c* having the slit 7*d*.

(Second Embodiment)

Figure 4:
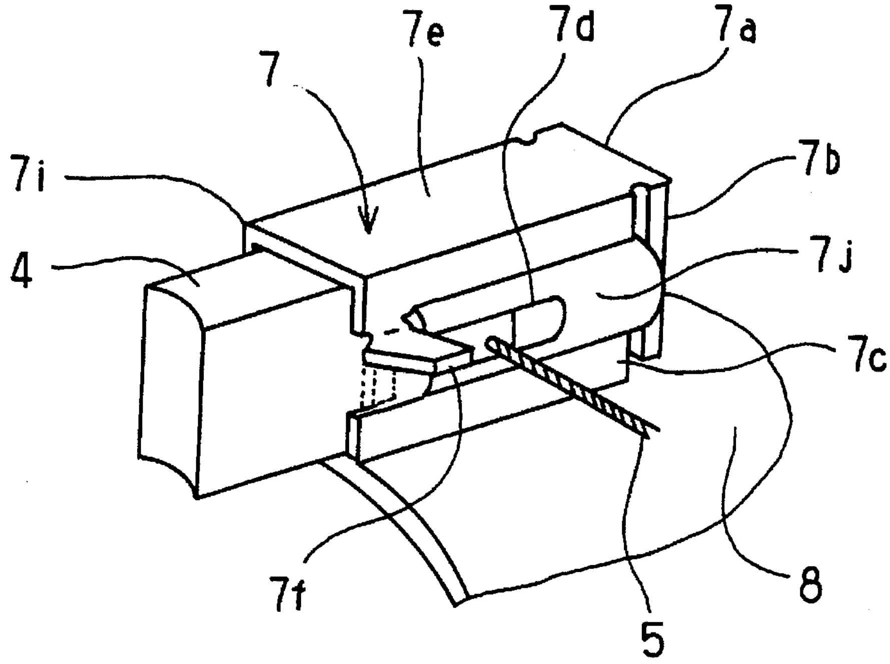
FIG. 4 is a perspective view illustrating the brush apparatus of the second embodiment.

In the second embodiment shown in FIG. 4, the slit 7*d* and the stopper piece 7*f* both are formed at the side surface 7*c* of the brush holder 7. The brush 4 can be inserted into the brush holder 7 while the stopper piece 7*f* is held as shown by solid line in FIG. 4. After a brush insertion, the stopper piece 7*f* is bent to a position indicated by a dotted line to close an entrance opening portion of the slit 7*d*. Thus, the brush 4 can be prevented from coming off. As shown in FIG. 4, an arc surface 7*j* having a cylindrical shape in correspondence to the coil spring 6 is formed at the side surface 7*c* of the brush holder 7 and the slit 7*d* is formed on the arc surface 7*j*.

(Third Embodiment)

Figure 5:
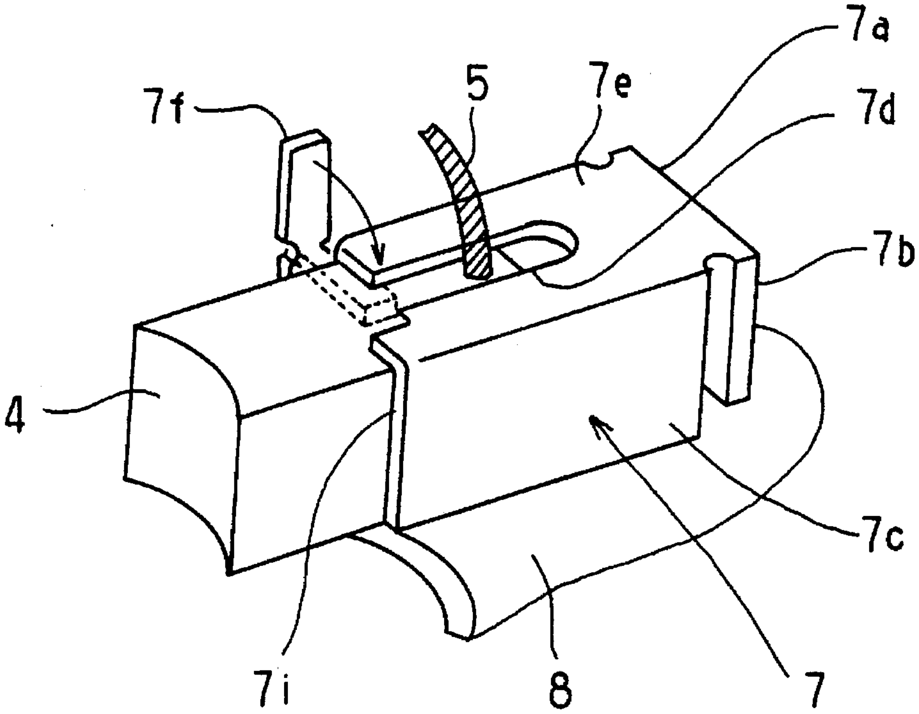
FIG. 5 is a perspective view illustrating the brush apparatus of the third embodiment.

In the third embodiment shown in FIG. 5, in the brush holder 7, the slit 7*d* and the stopper piece 7*f* both are formed on the surface 7*e* extending in parallel to the substrate 8. However, in the same manner as in the first and the second embodiments, brush insert assembly work into the brush holder 7 is simplified and the brush 4 can be prevented from coming off due to wearing of the same.

(Fourth Embodiment)

Figure 6A:
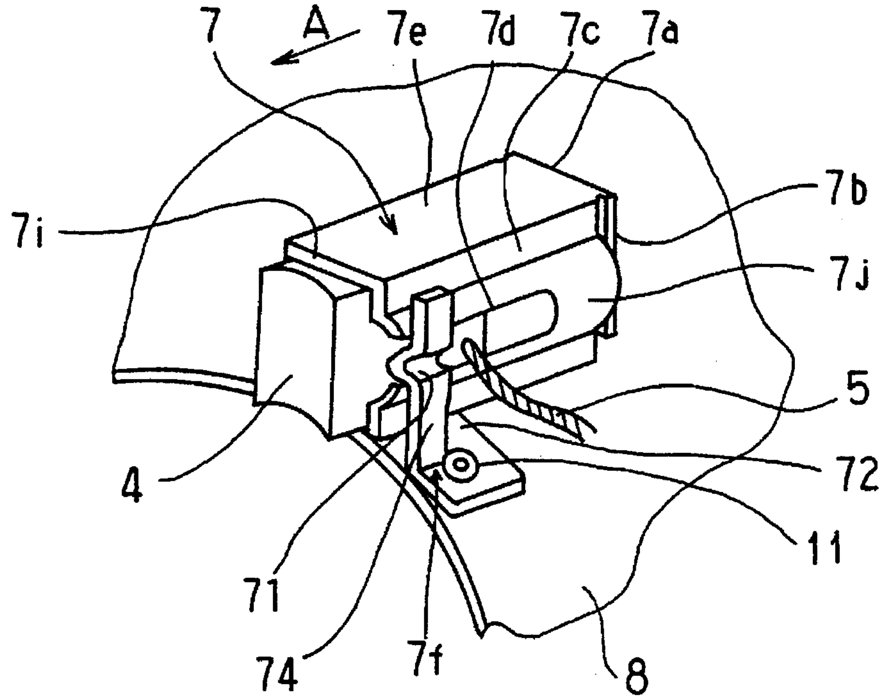
FIG. 6A is a perspective view illustrating the brush apparatus of the fourth embodiment.
Figure 6B:
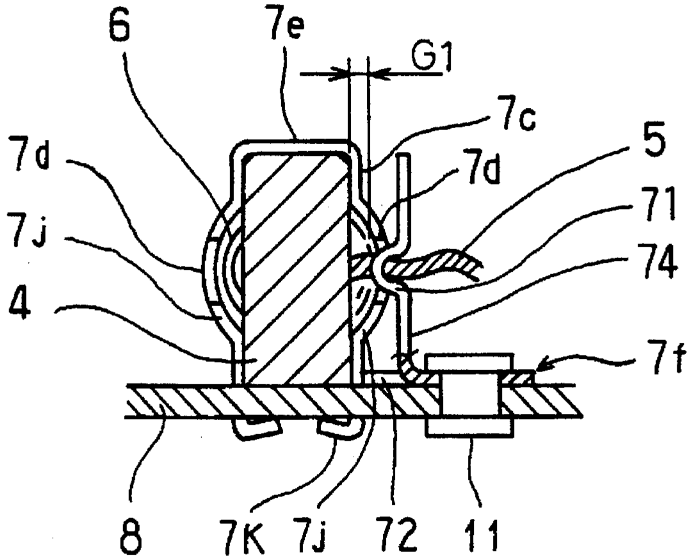
FIG. 6B is a side view illustrating the brush apparatus of the fourth embodiment.

Since a motor to which the fourth embodiment is applied is the same as in FIG. 1, a detailed explanation is omitted and only its characteristic difference is explained with reference to FIG. 6. In the embodiment, the stopper piece 7*f* is formed separately from the brush holder 7. That is, the stopper piece 7*f* is formed into a generally L-shape. As the brush holder 7 is, the stopper piece 7*f* is made of a metallic material such as brass or stainless steel which is easily bendable and is fixed by fixing means such as an eyelet 11 or a rivet to the substrate 8. The stopper piece 7*f* may also be made of a resin material.

On the side surface 7*c* of the brush holder 7, an arc surface 7*j* in the cylindrical shape of the coil spring 6 is formed and the slit 7*d* is formed thereat. On the stopper piece 7*f*, a project portion 71 having a U-shape in the middle of a surface 74 extending parallel to the side surface 7*c* of the brush holder 7 is formed integrally. In such a manner that the U-shape project portion 71 is positioned in an entrance opening portion of the slit 7*d*, the stopper piece 7*f* is fixed to the substrate 8. The clearance G1 between a tip of the U-shaped project portion 71 of the stopper piece 7*f* and the brush 4 is determined in a range less than twice the thickness of the pigtail 5 for the same reason as mentioned before. The minimum of the clearance G1 needs 0.03 mm so as to avoid contacting with the brush 4. Only the brush holder 7 is fixed to the substrate 8 by an assembly claw portion 7*k* and the stopper piece 7*f* is not fixed thereto. Thus, the pigtail 5 of the brush 4 is inserted into the slit 7*d* and kept deep away from an entrance opening portion of the slit 7*d*, and the brush 4 is inserted into the brush holder 7. Therefore, insert assembly work of the brush 4 can be extremely simplified.

Keeping the pigtail 5 at a position away from an entrance opening portion of the slit 7*d*, the U-shaped project portion 71 of the stopper piece 7*f* is inserted into the entrance opening portion of the slit *7d* and the stopper piece *7f* is fixed at the substrate 8 by the eyelet 11. After the coil spring 6 is inserted into the brush holder 7 from the rear end portion *7a*, the holding surface *7b* is bent and the spring 6 is held.

As the motor rotates and the brush 4 wears gradually, the brush 4 moves in the arrow direction A. The clearance G1 is set to a small value less than twice the thickness of the pigtail 5, and therefore the pigtail 5 certainly contacts the stopper piece *7f* and can be prevented from coming off. Even when the pigtail 5 enters between the brush 4 and the stopper piece *7f*, the coil spring 6 can be prevented from coming off. This is because that an outer diameter of the coil spring 6 is larger than width dimension of the brush 4, the U-shape project portion 71 of the stopper piece *7f* is inserted into the entrance opening portion of the slit *7d* and a tip of the project portion 71 is located radially inside the outer diameter of the coil spring 6. The advantage that the coil spring 6 comes off can be prevented in this embodiment is the same as in the second embodiment in FIG. 4.

In the stopper piece *7f*, a rectangular contact piece 72 contacting a base portion of the side surface *7c* of the brush holder 7 is formed. Therefore, the side surface *7c* of the brush holder 7 contacts the rectangular contact piece 72 so that the stopper piece *7f* can be prevented from rotating when the stopper piece *7f* is installed.

(Fifth Embodiment)

Figure 7:
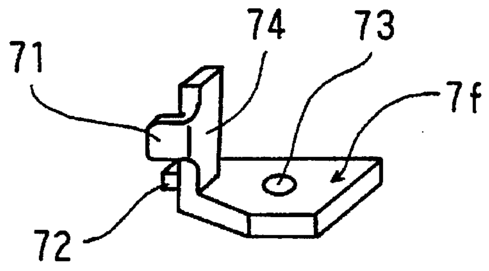
FIG. 7 is a perspective view illustrating a stopper piece of the fifth embodiment.

A shape of the project portion 71 at the stopper piece *7f* is not limited to the U-shape. Instead of the U-shape, as shown in FIG. 7, on the stopper piece *7f*, the project portion 71 is formed by bending perpendicularly at the middle of the surface 74 extending parallel to the side surface *7c* of the brush holder 7. An insert hole 73 is formed for the eyelet 11.

(Sixth Embodiment)

Figure 8:
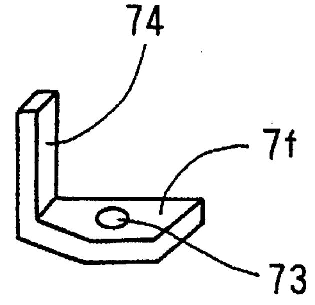
FIG. 8 is a perspective view illustrating a stopper piece of the sixth embodiment.

As shown in FIG. 8, at the stopper piece *7f*, the project portion 71 is not formed on the surface 74 extending in parallel to the side surface *7c* of the brush holder 7. Even extending as a straight line, the clearance G1 between the stopper piece *7f* and the brush 4 is determined in a range less than twice the thickness of the pigtail 5 so that the brush 4 and the spring 6 can be prevented from coming off.

(Seventh Embodiment)

Figure 9:
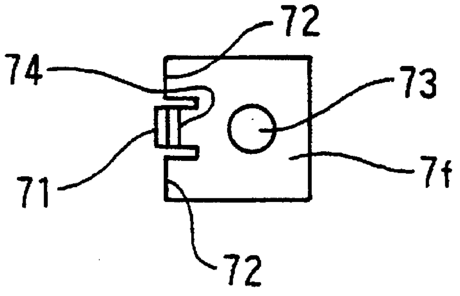
FIG. 9 is a top plan view illustrating a stopper piece of the seventh embodiment.

As shown in FIG. 9, the rectangular contact pieces 72 for a detent of the stopper piece *7f*, i.e., for prevention of turning, is formed in both left and right sides of the project portion 71.

(Eighth Embodiment)

Figure 10:
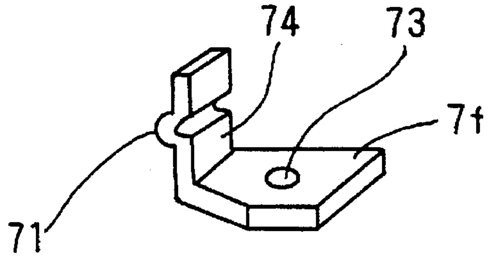
FIG. 10 is a perspective view illustrating a stopper piece of the eighth embodiment.

As shown in FIG. 10, without forming the rectangular contact piece 72 for a detent of the stopper piece *7f* specially, width of the surface 74 forming the project portion 71 is made larger so that the stopper piece *7f* can be prevented from rotating or turning.

(Ninth Embodiment)

Figure 11A:
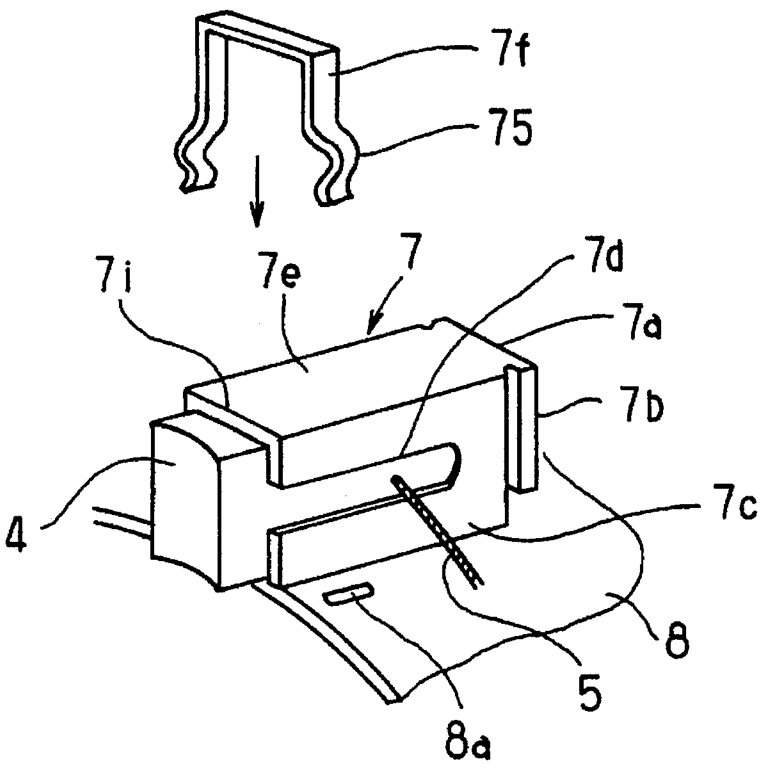
FIGS. 11A and 11B are perspective views illustrating brush apparatus of the ninth embodiment.
Figure 11B:
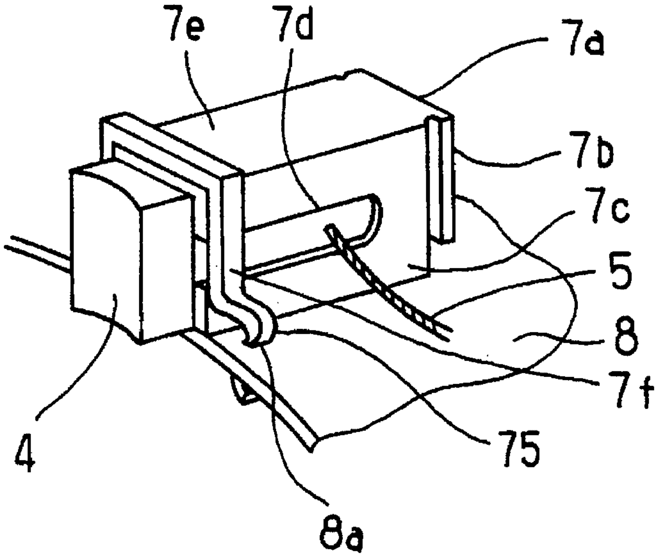

Fixing means of the stopper piece *7f* is not limited to fixing means such as the eyelet 11 or the rivet. As shown in FIG. 11A in the ninth embodiment, the stopper piece *7f* made of a metallic or a resin spring material is formed into a gate-shape. An arc-shaped portion 75 having elasticity is formed at a bottom end portion of a leg portion of the gate-shaped stopper piece *7f*. After insert assembly work of the brush 4, by using elasticity of the arc-shaped portion 75, the stopper piece *7f* is inserted into and fixed to an assembly hole portion *8a* of the substrate 8 as shown in FIG. 11B. An entrance opening portion of the slit *7d* of the brush holder 7 is closed by the stopper piece *7f*. Thus, the pigtail 5 contacts the stopper piece *7f* so that the brush 4 can be prevented from coming off due to wearing away.

(Tenth Embodiment)

Figure 12A:
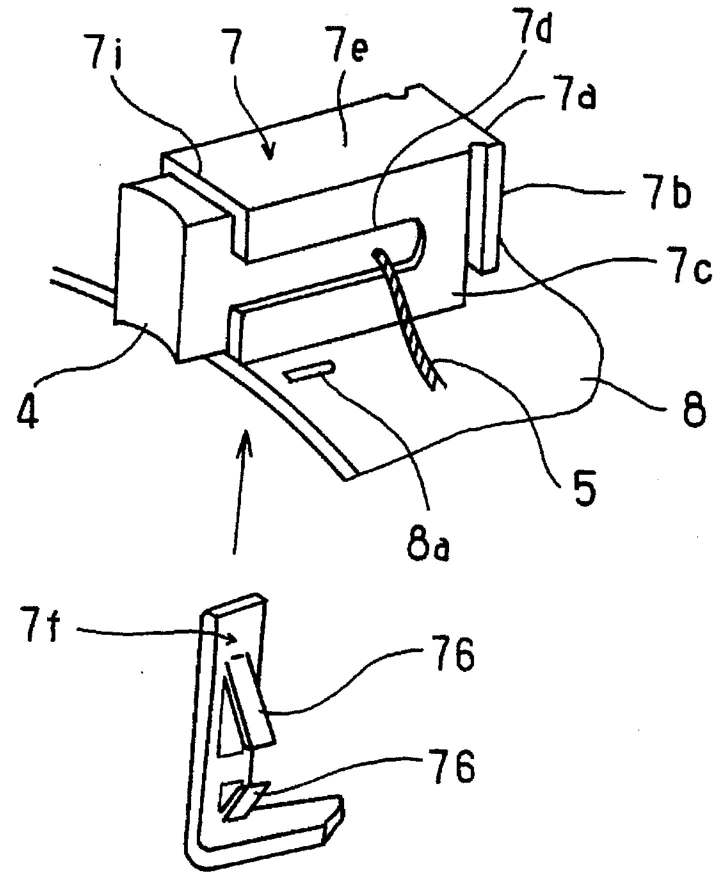
FIGS. 12A and 12B are perspective views illustrating brush apparatus of the tenth embodiment.
Figure 12B:
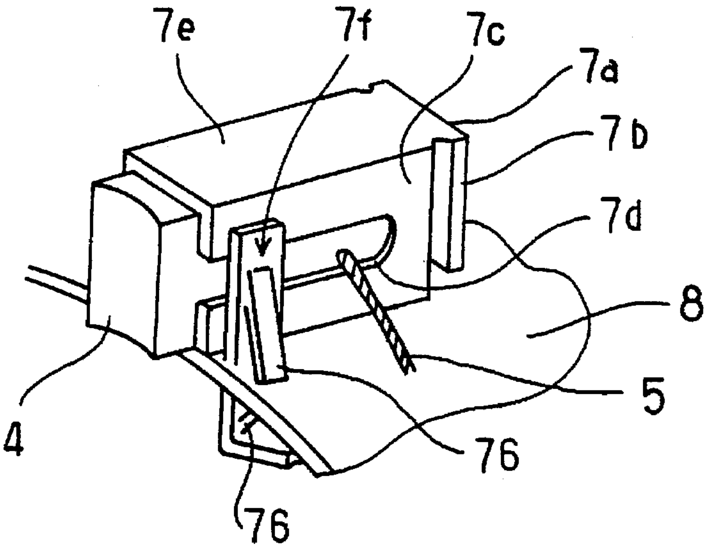

The tenth embodiment is a modification of the ninth embodiment mentioned above. As shown in FIG. 12A, two small spring pieces 76 are formed integrally on the stopper piece *7f* made of elastic material, and the stopper piece *7f* is inserted into and fixed to the assembly hole portion *8a* of the substrate 8 by the spring pieces 76 as shown in FIG. 12B. Alternatively, the stopper piece *7f* can be fixed by using adhesive.

(Eleventh Embodiment)

Figure 13:
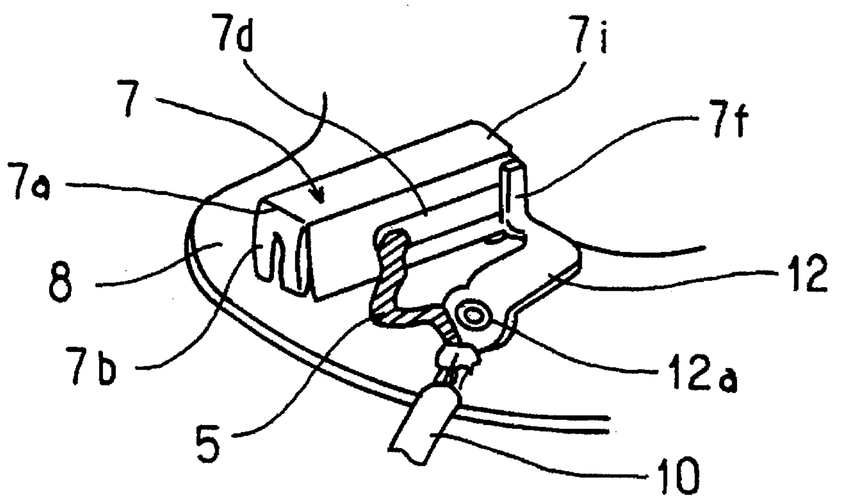
FIG. 13 is a perspective view illustrating a brush apparatus of the eleventh embodiment.

As shown in FIG. 13, the stopper piece *7f* is formed integrally with a terminal plate 12 to which the pigtail 5 and a lead wire 10 are connected electrically. The terminal plate 12 is made of a conducting member like brass and shaped to be fixed to the substrate 8 by fixing means like an eyelet *12a*. After insert of the brush 4, the terminal plate 12 is fixed to the substrate 8 so that an entrance opening portion of the slit *7d* of the brush holder 7 is closed by the stopper piece *7f* formed on the terminal plate 12.

According to the present embodiment, not only the same operating effect as in fourth through tenth embodiments in FIGS. 6 through 11 can be carried out, but also the number of members as well as the cost can be reduced.

(Twelfth Embodiment)

The motor to which the brush apparatus is applied in the twelfth embodiment is the same as in FIG. 1 and, hence, only characteristic difference will be explained with reference to FIG. 14. In the embodiment, the brush 4 has, at a rear end portion in the direction A, a width being narrower than brush width W. A pigtail take-out portion *4a* is formed at the rear end portion having the narrow width and the pigtail 5 is fixed thereto.

On the other hand, a first slit 710 and a second slit 720 formed into a key shape are formed on the brush holder 7. That is, the L-shaped first slit 710 extending in the same direction as the arrow direction A of the brush 4 and bending the tip end side thereof perpendicularly to the surface *7e* is formed at the side surface *7c* (the surface extending perpendicular to the substrate 8) of the brush holder 7. The stopper piece *7f* is formed at a wall portion locating at a side of the front end portion *7i*. The second slit 720 having an opening portion opening toward the front end portion *7i* of the brush holder 7 is formed on the surface *7e* differing from the side surface *7c* forming the first slit 710 therein. The second slit 720 communicates with a perpendicular bent portion in the front end side of the first slit 710 at the rear end side of the second slit 720.

According to the twelfth embodiment, the pigtail 5 usually held at a position "b" is bent and fixed at a position "a", thereafter the brush 4 is inserted into the brush holder 7. At this time, since the pigtail 5 passes through the second slit 720, the brush 4 is easily inserted into the brush holder 7. After the brush 4 is inserted until a position where the pigtail 5 contacts a rear end surface of the second slit 720, the pigtail 5 is returned to the position "b" and can pass through a parallel portion of the first slit 710 in the arrow direction A. Therefore, the brush 4 can be inserted more inwardly in the brush holder 7. The coil spring 6 (see FIG. 1, not shown in FIG. 14) is inserted into the brush holder 7 and the holding surface *7b* is bent.

As the motor mentioned above is operated and the brush 4 is worn, the pigtail 5 contacts the stopper piece *7f* formed at the side surface *7c* of the brush holder 7 and the brush 4 and the spring 6 can be prevented from coming off. This is because the pigtail 5 is at the position "b" and a clearance between the brush 4 and the stopper piece *7f* is set to a small value regardless of brush insert work.

In the embodiment, the stopper piece *7f* is formed integrally with the brush holder 7 and the number of members is not increased any more, the cost is reduced, assembling the brush 4 is simplified and the brush 4 can be prevented from coming off.

(Thirteenth Embodiment)

Figure 15:
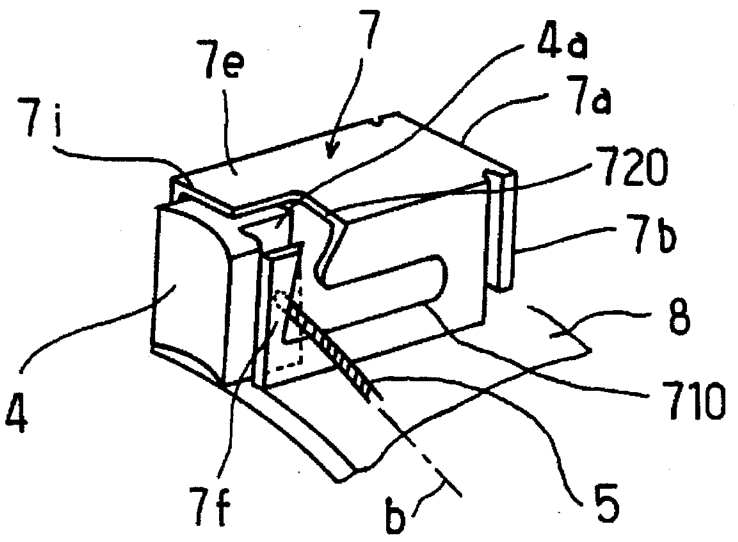
FIG. 15 is a perspective view illustrating a brush apparatus of the thirteenth embodiment.

As shown in FIG. 15, the stopper piece *7f* is so formed into a taper shape as to expand upward from the side of the substrate 8. Thus, the pigtail 5 is hard to move from the first slit 710 to the side of the second slit 720. Therefore, even under the condition that a vibration is large and the pigtail 5 can move easily, the pigtail 5 is hooked at the taper shape of the stopper piece *7f* and does not return to the position "a" of brush assembly work. Thus, the brush 4 can be surely prevented from coming off.

(Fourteenth Embodiment)

Figure 14:
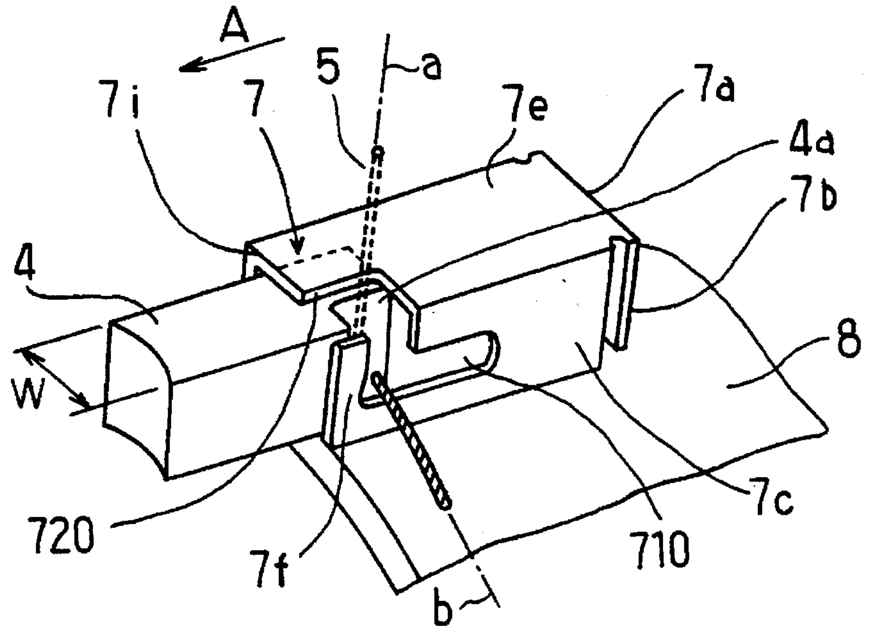
FIG. 14 is a perspective view illustrating a brush apparatus of the twelfth embodiment.
Figure 16:
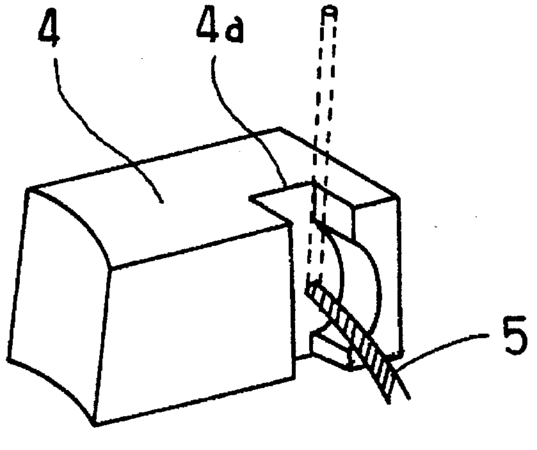
FIG. 16 is a perspective view illustrating a brush apparatus of the fourteenth embodiment.

Although the rear end side of the brush 4 is made narrow and the pigtail take-out portion *4a* is formed into a step shape in the embodiment shown in FIGS. 14 and 15, as shown in FIG. 16, the pigtail take-out portion *4a* can be formed in a groove shape in the middle of the rear end side of the brush 4. The shape of the brush holder 7 is the same as the one in FIGS. 14 or 15.

(Fifteenth Embodiment)

Figure 17A:
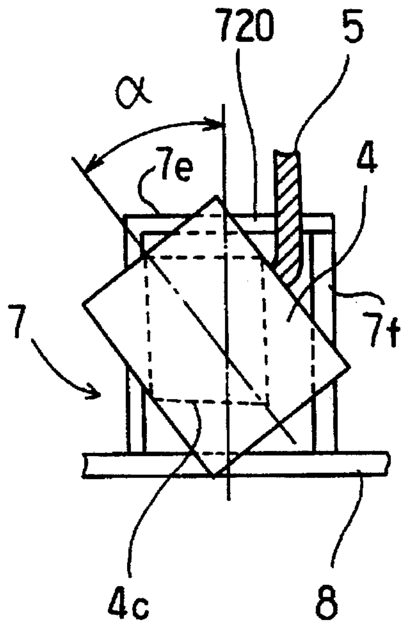
FIG. 17A is a side view illustrating a brush apparatus of the fifteenth embodiment.
Figure 17B:
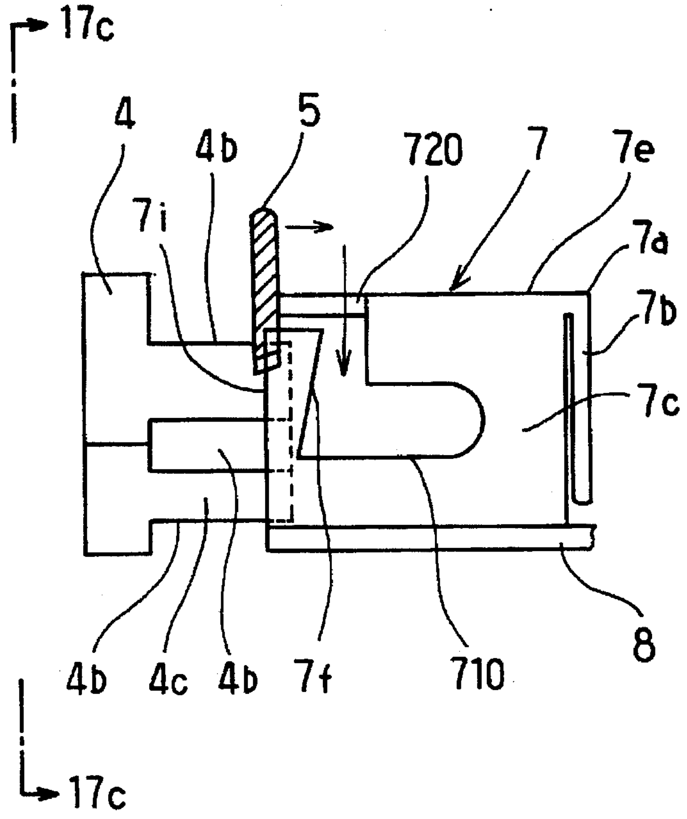
FIG. 17B is a front view illustrating a brush apparatus of the fifteenth embodiment.
Figure 17C:
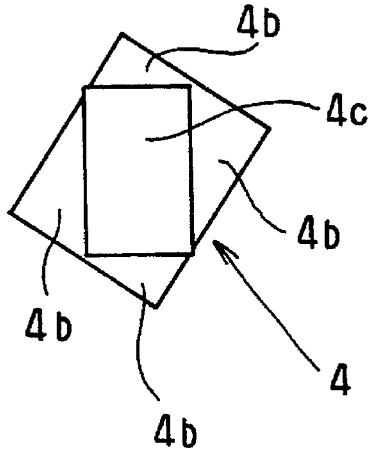
FIG. 17C is a side view illustrating a brush apparatus in FIG. 17B.

As shown in FIG. 17C, four corner portions *4b* of the rear end side of the brush 4 having a generally rectangular cross section are chamfered and a rectangular portion *4c* having a small area and tilting with a fixed angle α is formed. As shown in FIGS. 17A and 17B, when the brush 4 is inserted, the brush 4 is placed at a position where the pigtail 5 passes through the second slit 720 and the small area rectangular portion *4c* is inserted into the brush holder 7. Therefore, since the pigtail 5 passes through the second slit 720, the brush 4 can be easily inserted into the brush holder 7. After the brush 4 is inserted to the position where the pigtail 5 contacts the rear end portion of the second slit 720, the brush 4 is rotated by a fixed angle α so that the pigtail 5 can pass through a parallel portion of the first slit 710 in the arrow direction A. Thus, the brush 4 can be inserted more inward in the brush holder 7. The brush 4 slides on an inner surface of the brush holder 7 by the large area rectangular portion of its front portion.

In the embodiment, the clearance between the stopper piece *7f* formed at the side surface *7c* of the brush holder 7 and the brush 4 is set to a small value regardless of brush insert assembly. When the brush 4 is worn, the pigtail 5 contacts the stopper piece *7f* and the brush 4 and the spring 6 can be prevented from coming off.

(Sixteenth Embodiment)

Figure 18:
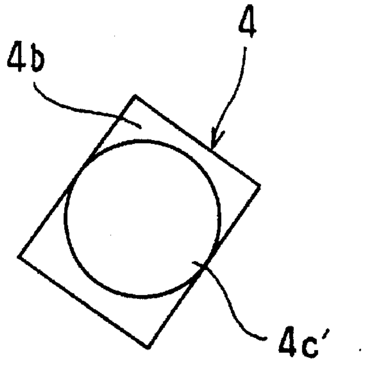
FIG. 18 is a side view illustrating a brush apparatus of the sixteenth embodiment.

As shown in FIG. 18, instead of the small area rectangular portion *4c*, a small area circular potion *4c'* is formed so that the same operation and effect as in the fifteenth embodiment can be obtained.

(Seventeenth Embodiment)

Figure 19A:
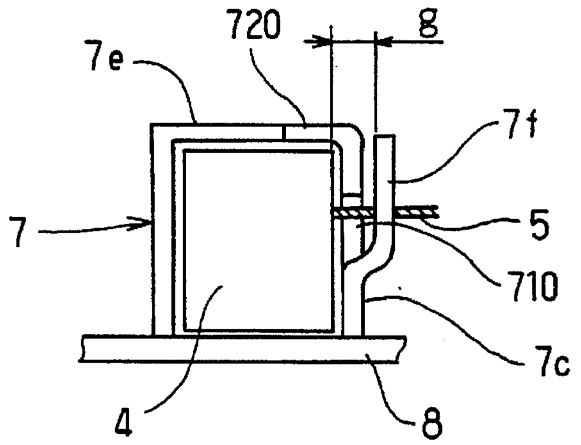
FIG. 19A is a side view illustrating a brush apparatus of the seventeenth embodiment.
Figure 19B:
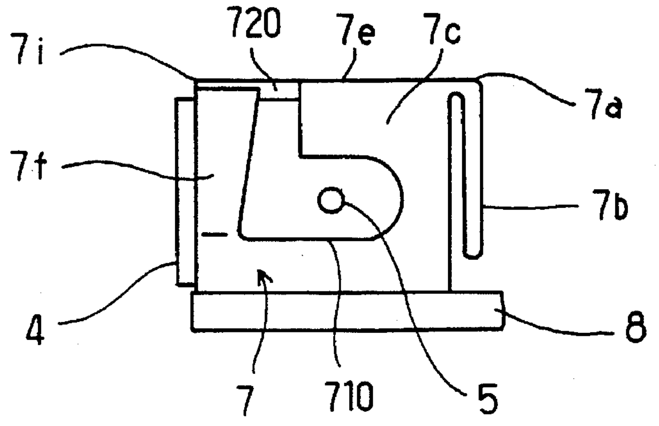
FIG. 19B is a front view illustrating the brush apparatus of the seventeenth embodiment.

This embodiment is a modification of the twelfth through sixteenth embodiments shown in FIGS. 14 through 18. As shown in FIGS. 19A and 19B, the brush 4 is the same as the ones in the twelfth through sixteenth embodiments. On the other hand, the stopper piece *7f* of the brush holder 7 is shaped in a form bending outward as shown in FIG. 19A and fixed a clearance "g" is provided between the brush 4 and the stopper piece *7f*.

The pigtail 5 is at the position "b" shown in FIG. 14 when the brush 4 is formed and is bent to the position "a" at the time of brush insert work. By providing fixed the clearance "g", an amount which the pigtail 5 is bent to the position "a" is reduced and an assembly work can be improved. With the reasons mentioned above, fixed the clearance "g" should be determined to a range less than twice the thickness of the pigtail 5 so as to prevent the brush 4 from coming off.

(Eighteenth Embodiment)

Figure 20A:
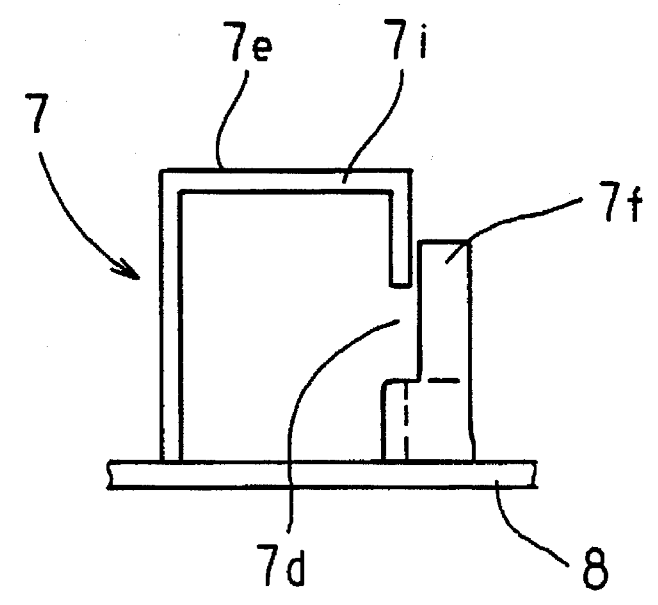
FIG. 20A is a side view illustrating a brush apparatus of the eighteenth embodiment.
Figure 20B:
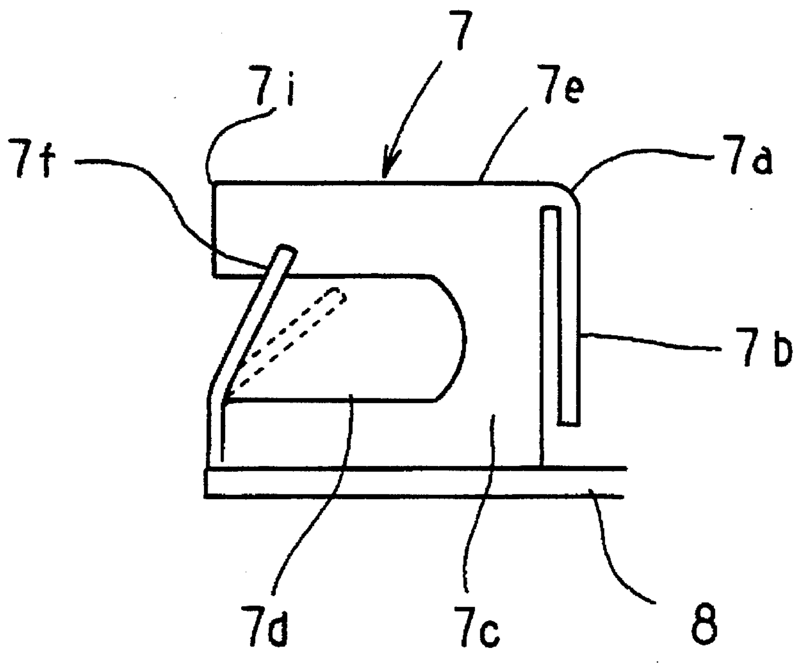
FIG. 20B is a front view illustrating the brush apparatus of the eighteenth embodiment.

In FIG. 20, the stopper piece *7f* made of elastic material with ability of closing an entrance opening portion is formed at the entrance opening portion of the slit *7d* of the brush holder 7. The stopper piece *7f* is formed integrally with the brush holder 7 and tilts by a small angle toward the rear end portion *7a* from the front end portion *7i* of the brush holder 7. On the other hand, the brush 4 need not be in a special form and a normal one shown in FIG. 3 can be used. When the brush 4 is inserted into the brush holder 7, the stopper piece *7f* tilting toward the side of the rear end portion *7a* shown by a dotted line in FIG. 20B is pressed more to the side thereof and elastically deformed. Then, the pigtail 5 is inserted into the slit *7d*. Thus, the brush 4 is easily inserted into the brush holder 7. After the inserting work of the brush 4, the stopper piece *7f* returns to the position indicated by the solid line in FIG. 20B by elasticity thereof and the spring 6 is assembled later.

In this embodiment, the clearance between the stopper piece *7f* formed at the front end portion *7i* of the side surface *7c* of the brush holder 7 and the brush 4 is set to a small value regardless of brush insert work. Therefore, when the brush 4 is worn, the pigtail 5 contacts the stopper piece *7f* and the brush 4 and the spring 6 can be prevented from coming off. In order to prevent the brush 4 and the spring 6 from coming off, the stopper piece *7f* needs enough strength.

In the fourth through eighteenth embodiments shown in FIGS. 6 through 20A and 20B, the stopper piece *7f* need not be bent like in the first through third embodiments. As a result, the stopper piece *7f* need not be made of metal. The brush holder 7 can be made of a resin integrally with the substrate 8. In this case, since the holding surface *7b* of the spring 6 is formed integrally, the brush 4 can be assembled in the brush holder 7 after the spring 6 is assembled therein.

The present invention having been described above should not be limited to the foregoing embodiments but may be modified in many other ways without departing from the spirit and scope of the invention.

What is claimed is:

1. A brush apparatus comprising:

a brush having a rear end portion and a front end portion;

a pigtail fixed to said brush to be held by the brush;

a brush holder having an opening portion at a front end portion and receiving said brush through said opening portion of said front end portion;

spring means held in said brush holder and pressing said brush holder toward an outside of said front end portion of said brush holder; and a substrate holding said brush holder, wherein:

said rear end portion of the brush is formed with a pigtail take-out portion that is narrower in width than the front end portion of said brush with said pigtail being fixed to said take-out portion;

said brush holder has a stopper piece formed at a wall portion of said front end portion;

said brush holder has a first slit formed to extend parallel to a longitudinal direction of said brush at a position adjoining said stopper piece;

said brush holder has a second slit opening at said front end portion on a different surface from a surface forming said first slit;

said first slit and said second slit are connected at a portion at a side of a more rear end portion of said brush holder than said stopper piece, and said first slit and said second slit are so constructed that, when said brush is inserted into said brush holder, said pigtail passes through said second slit and then, said pigtail is inserted into said first slit to contact said stopper piece.

* * * * *